(12) United States Patent
Tanaka et al.

(10) Patent No.: US 7,717,206 B2
(45) Date of Patent: *May 18, 2010

(54) AIR INTAKE SYSTEM FOR OFF-ROAD VEHICLE

(75) Inventors: Norihiko Tanaka, Newnan, GA (US); Kazuhiko Izumi, Shizuoka-ken (JP); Akira Inui, Shizuoka-ken (JP); Eiji Kato, Shizuoka-ken (JP); Colby Nash, Newnan, GA (US)

(73) Assignees: Yamaha Hatsudoki Kabushiki Kaisha, Shizuoka (JP); Yamaha Motor Manufacturing Corporation of America, Newnan, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/926,749

(22) Filed: Oct. 29, 2007

(65) Prior Publication Data

US 2008/0053727 A1 Mar. 6, 2008

Related U.S. Application Data

(63) Continuation of application No. 10/790,932, filed on Mar. 2, 2004, now Pat. No. 7,287,619.

(60) Provisional application No. 60/460,068, filed on Apr. 2, 2003, provisional application No. 60/459,958, filed on Apr. 2, 2003.

(51) Int. Cl.
B60K 13/02 (2006.01)

(52) U.S. Cl. .................. 180/68.3; 180/908; 180/291

(58) Field of Classification Search ............. 180/215, 180/217, 233, 244, 248, 249, 252, 291, 296, 180/297, 309, 908, 56, 68.1, 68.3, 68.4, 69.1, 180/69.2, 69.4, 89.2, 90.6; 296/184.1, 187.08, 296/193.07; 123/41.04, 41.56, 41.62; 454/144
See application file for complete search history.

(56) References Cited

U.S. PATENT DOCUMENTS

| 438,644 A | 10/1890 | Robertson |
| 1,852,464 A | 4/1932 | Leipert .................... 180/89.16 |
| 2,145,545 A | 1/1939 | Johnson et al. |

(Continued)

FOREIGN PATENT DOCUMENTS

JP 31-19213 12/1956

(Continued)

OTHER PUBLICATIONS

Schematic views of Mercedes Benz Unimog utility vehicle, current model of Unimog produced as early as 2000, views obtained from various internet sites, see 3 attached pages.*

(Continued)

*Primary Examiner*—Glenn Dayoan
*Assistant Examiner*—Vaughn T Coolman
(74) *Attorney, Agent, or Firm*—Keating & Bennett, LLP

(57) ABSTRACT

An off-road vehicle includes a frame and four wheels that support the frame. Two seat assemblies are disposed side by side on the frame. The seat assemblies are separated from each other to define a space therebetween. An engine powers the wheels. The engine defines an air intake port that communicates with a combustion chamber. An air intake system delivers air to the intake port. At least a portion of the air intake system extends through the space.

18 Claims, 6 Drawing Sheets

U.S. PATENT DOCUMENTS

| | | | |
|---|---|---|---|
| 2,315,317 A | | 3/1943 | Copp et al. |
| 2,700,428 A | * | 1/1955 | Nallinger ................. 180/89.19 |
| 2,707,402 A | | 5/1955 | Blair |
| 2,850,852 A | | 9/1958 | Hofberger |
| 3,147,814 A | | 9/1964 | Suhre ........................ 180/68.1 |
| 3,149,856 A | | 9/1964 | Schilberg |
| 3,229,424 A | | 1/1966 | Fairchok |
| 3,419,098 A | * | 12/1968 | Mayers et al. ................. 180/11 |
| 3,709,314 A | | 1/1973 | Hickey ....................... 180/249 |
| 3,733,918 A | | 5/1973 | Domaas |
| 3,943,785 A | | 3/1976 | Percifield |
| 4,350,124 A | | 9/1982 | Kitano et al. ............ 123/198 T |
| 4,497,285 A | | 2/1985 | Kondo |
| 4,531,928 A | | 7/1985 | Ikenoya |
| 4,534,442 A | | 8/1985 | Botar |
| 4,650,029 A | | 3/1987 | Foote et al. |
| 4,671,373 A | | 6/1987 | Sigl |
| 4,681,185 A | | 7/1987 | Hoernig |
| 4,697,665 A | | 10/1987 | Eastman et al. |
| 4,733,639 A | | 3/1988 | Kohyama et al. |
| 4,744,432 A | | 5/1988 | Shibata et al. |
| 4,751,856 A | | 6/1988 | Nakamura |
| 4,765,434 A | | 8/1988 | Kawamoto |
| 4,773,675 A | | 9/1988 | Kosuge ...................... 280/781 |
| 4,792,012 A | | 12/1988 | Morisawa |
| 4,815,550 A | | 3/1989 | Mather et al. |
| 4,817,985 A | | 4/1989 | Enokimoto et al. |
| 4,821,685 A | | 4/1989 | Matsushima et al. |
| 4,883,138 A | | 11/1989 | Kameda |
| 4,895,217 A | | 1/1990 | Hueckler et al. |
| 4,955,853 A | | 9/1990 | Bausch |
| 4,966,408 A | * | 10/1990 | Yura ....................... 296/181.5 |
| 5,005,663 A | | 4/1991 | Niide |
| 5,044,646 A | | 9/1991 | Liga et al. |
| 5,054,573 A | | 10/1991 | Bennett |
| 5,054,842 A | | 10/1991 | Ishiwatari et al. |
| 5,071,392 A | | 12/1991 | Stall |
| 5,086,858 A | | 2/1992 | Mizuta et al. |
| 5,101,924 A | | 4/1992 | Yamagiwa et al. |
| 5,125,490 A | | 6/1992 | Suzumura |
| 5,195,607 A | | 3/1993 | Shimada et al. |
| 5,201,379 A | * | 4/1993 | Penzotti et al. .......... 180/89.18 |
| 5,251,713 A | | 10/1993 | Enokimoto ................ 180/68.4 |
| 5,257,672 A | | 11/1993 | Ohtagaki |
| 5,314,378 A | | 5/1994 | Ohtagaki |
| 5,327,989 A | | 7/1994 | Furuhashi et al. |
| 5,366,041 A | | 11/1994 | Shiraishi |
| 5,451,188 A | | 9/1995 | Kraft |
| 5,505,267 A | | 4/1996 | Orbach |
| 5,509,710 A | * | 4/1996 | Eavenson et al. ............. 296/19 |
| 5,575,352 A | | 11/1996 | Suzuki et al. |
| 5,577,747 A | | 11/1996 | Ogawa et al. |
| 5,873,428 A | | 2/1999 | Ohshita et al. |
| 5,950,748 A | | 9/1999 | Matsumoto et al. ........ 180/6.24 |
| 5,980,415 A | | 11/1999 | Showalter |
| 6,016,883 A | | 1/2000 | Yamada |
| 6,038,506 A | | 3/2000 | Diekhans |
| 6,076,624 A | | 6/2000 | Izumi et al. |
| 6,085,138 A | | 7/2000 | Smith |
| 6,105,702 A | | 8/2000 | Showalter |
| 6,108,601 A | | 8/2000 | Breithor |
| 6,155,371 A | | 12/2000 | Izumi |
| 6,202,777 B1 | | 3/2001 | Surridge |
| 6,230,836 B1 | * | 5/2001 | Cowan et al. ............... 180/118 |
| 6,269,899 B1 | | 8/2001 | Izumi |
| 6,273,074 B1 | | 8/2001 | Kawamata |
| 6,405,823 B1 | | 6/2002 | Fukamachi et al. ......... 180/297 |
| 6,502,659 B2 | | 1/2003 | Akasaka ..................... 180/309 |
| 6,510,912 B1 | | 1/2003 | Atsuumi |
| 6,533,060 B1 | | 3/2003 | Seto |
| 6,582,004 B1 | | 6/2003 | Hamm |
| 6,622,806 B1 | | 9/2003 | Matsuura .................. 180/68.1 |
| 6,626,260 B2 | | 9/2003 | Gagnon et al. |
| 6,648,093 B2 | | 11/2003 | Rioux et al. ................. 180/291 |
| 6,691,815 B2 | | 2/2004 | Rioux et al. |
| 6,695,083 B2 | | 2/2004 | Nakamura et al. ......... 180/68.1 |
| 6,695,086 B2 | | 2/2004 | Kawamoto |
| 6,874,590 B2 | | 4/2005 | Rondeau et al. |
| 2001/0013440 A1 | | 8/2001 | Izumi et al. |
| 2002/0070066 A1 | | 6/2002 | Nakamura |
| 2002/0125057 A1 | | 9/2002 | Kitai et al. |
| 2002/0139598 A1 | | 10/2002 | Miguchi |
| 2003/0146033 A1 | | 8/2003 | Malstrom |
| 2004/0084228 A1 | * | 5/2004 | Hurlburt ....................... 180/22 |

FOREIGN PATENT DOCUMENTS

| | | |
|---|---|---|
| JP | 57-58332 | 12/1982 |
| JP | 58-15230 | 3/1983 |
| JP | 58-44255 | 3/1983 |
| JP | 59-39920 | 3/1984 |
| JP | 59-77924 | 5/1984 |
| JP | 61-13093 | 4/1986 |
| JP | 05-57955 | 8/1993 |
| JP | 6-34213 | 9/1994 |
| JP | 10-035314 A | 2/1998 |
| JP | 2000-103246 | 4/2000 |

OTHER PUBLICATIONS www.redcougar.ca/u500.htm—images of 2005 Mercedes-Benz U500.* www.unimogsales.com/unimog-concept.html—images of Mercedes-Benz U3000 and U500.* http://www.unimog-trucks.com/fileadmin/Content/pdf/U500_Short.pdf dated May 23, 2003 available as early as Nov. 23, 2006.* http://www.autoevolution.com/trucks/mercedes-benz-unimog-u500-2002.html undated.*

Mercedes-Benz brochure "Unimog U300/U400. Unimog system. At home in all terrains." available on or before Mar. 6, 2003.*

Mercedes-Benz Brochure "The Unimog System. Every vehicle is a fleet in itself." dated Jan. 19, 2001.*

Mercedes-Benz brochure "Unimog U500. From professionals for professionals." dated Oct. 2001.*

"Key events in the Unimog's history"—http://www.unimog.com.au/index.php?id=208—no date.*

Mercedes-Benz brochure "Unimog U300/U400.The Mercedes among the impklement carriers." available on or before Mar. 6, 2003.*

Screen print of http://www.unimog.com/au/awd//brochures/—shows the brochures that are undated being "last modifed" or available on Mar. 6, 2003.*

ATV 1998 Yamaha Catalogue, Information about Grizzly 4WD; 8 pages.

ATV 1998 Yamaha Catalogue, Information about Breeze, 8 pages.

* cited by examiner

US 7,717,206 B2

AIR INTAKE SYSTEM FOR OFF-ROAD VEHICLE

PRIORITY INFORMATION

The present application is based on and claims the benefit of U.S. application Ser. No. 10/790,932, filed on Mar. 2, 2004; U.S. Provisional Application No. 60/460,068, filed on Apr. 2, 2003; and U.S. Provisional Application No. 60/459,958, filed on Apr. 2, 2003, pursuant to 35 U.S.C. §119(e).

BACKGROUND OF THE INVENTION

1. Field of the Invention

The present invention generally relates to an air intake system for an off-road vehicle, and more particularly to an improved air intake system for an off-road vehicle that has at least two seat assemblies.

2. Description of Related Art

Off-road vehicles are designed to be operated over rugged terrain. These vehicles are often operated off-road over terrain such as, for example, steep inclines and declines, rough roads, and areas covered in mud and water.

Off-road vehicles typically include a frame that is supported by wheels. In one common arrangement, the vehicle has four wheels, i.e., a pair of front wheels and a pair of rear wheels. An internal combustion engine is employed to power at least the rear or front wheels, and most commonly, all of the wheels. Typically, the engine is combined with a transmission to form an engine unit. The transmission transfers power to an output shaft from a crankshaft of the engine. The output shaft drives the wheels. For example, Japanese Utility Model Publication JP-Y2-H6-34213 discloses such an arrangement.

SUMMARY OF THE INVENTION

The engine has an air intake port communicating with a combustion chamber. An air intake system can be connected to the intake port to deliver air to the combustion chamber. The intake system can include components such as, for example, a throttle body and an air intake duct. Those components need sufficient protection.

Due to the typical environment in which off-road vehicles operate, the intake systems of the off-road vehicles are likely to be hit by rocks, wooden blocks or the like or to ingest water. The intake systems of the off-road vehicles, thus, require more protection than other types of vehicles.

A need therefore exists for an improved off-road vehicle that can substantially protect an air intake system of the vehicle.

One aspect of an embodiment of the present invention involves an off-road vehicle comprising a frame. A plurality of wheels supports the frame. At least two seat assemblies are disposed side by side on the frame. The seat assemblies are spaced apart from each other to define a space therebetween. An internal combustion engine powers the wheels. The engine comprises an air intake port. The air intake port is in direct communication with a combustion chamber. An air intake system delivers air to the intake port. At least a portion of the air intake system extends through the space.

In accordance with another aspect of an embodiment of the present invention, an off-road vehicle comprises a frame. A plurality of wheels supports the frame. At least two seat assemblies are disposed side by side on the frame. The seat assemblies are spaced apart from each other to define a space therebetween. An internal combustion engine powers at least one of the plurality of wheels. The engine comprises an air intake port and a combustion chamber. The air intake port communicates with a combustion chamber. The engine has a surface disposed within the space and the air intake port is at least partially positioned on the surface.

BRIEF DESCRIPTION OF THE DRAWINGS

The foregoing and other features, aspects and advantages of the present invention are described in detail below with reference to the drawings of a preferred embodiment, which is intended to illustrate and not to limit the invention. The drawings comprise six figures in which.

DETAILED DESCRIPTION OF THE PREFERRED EMBODIMENT

With reference to FIGS. 1-7, an off-road vehicle, and particularly an air intake system for the off-road vehicle is described. While the intake system is described in connection with this particular type of vehicle, those of skill in the art will appreciate that certain features, aspects, and advantages of the present invention may have utility in a wide range of applications for other vehicles. For instance, certain features, aspects and advantages of the present invention can be used with snow vehicles, tractors, utility vehicles, and the like.

Figure 1:
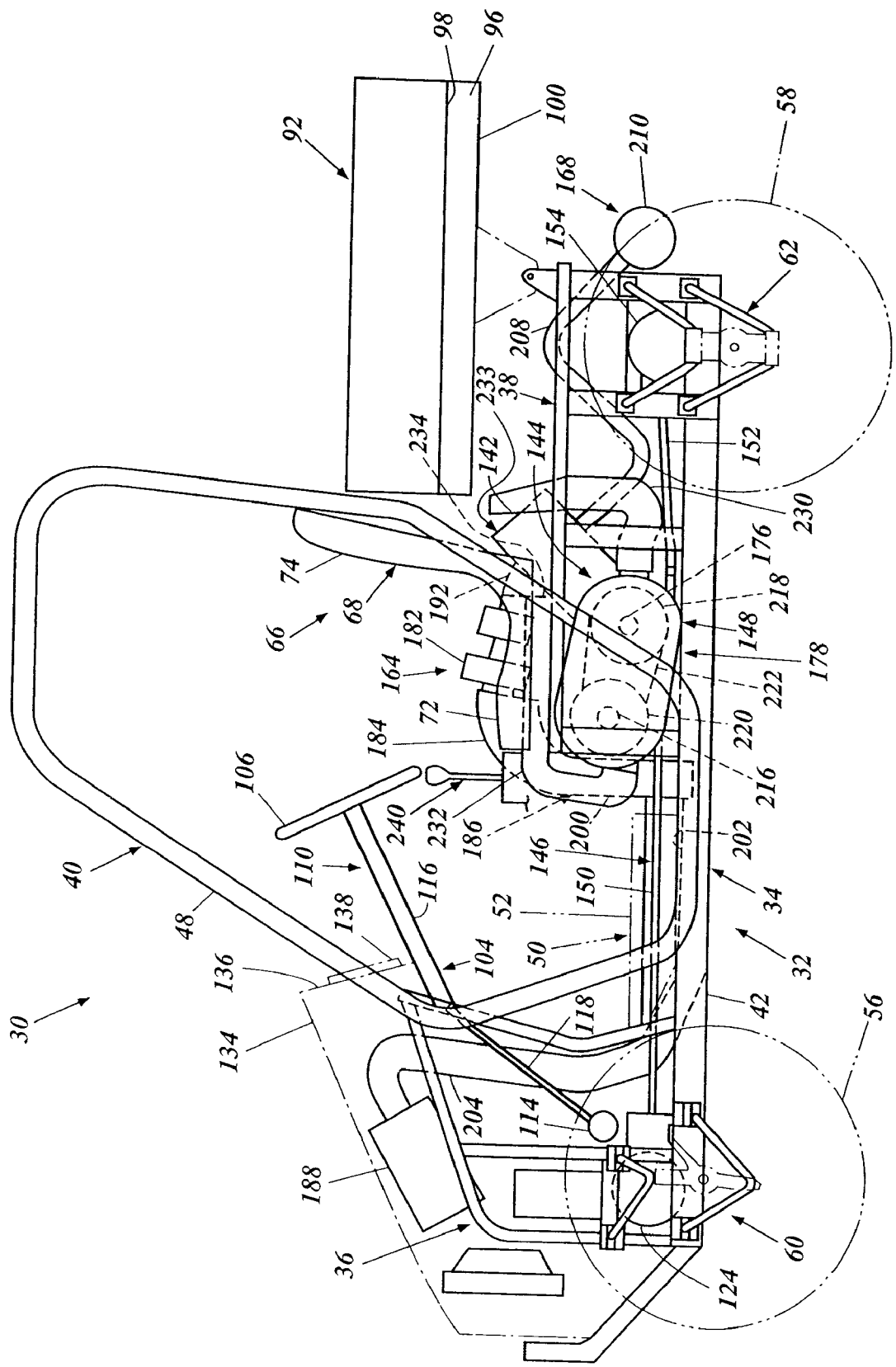
FIG. 1 is a side elevational view of an off-road vehicle configured in accordance with a preferred embodiment of the present invention.
Figure 2:
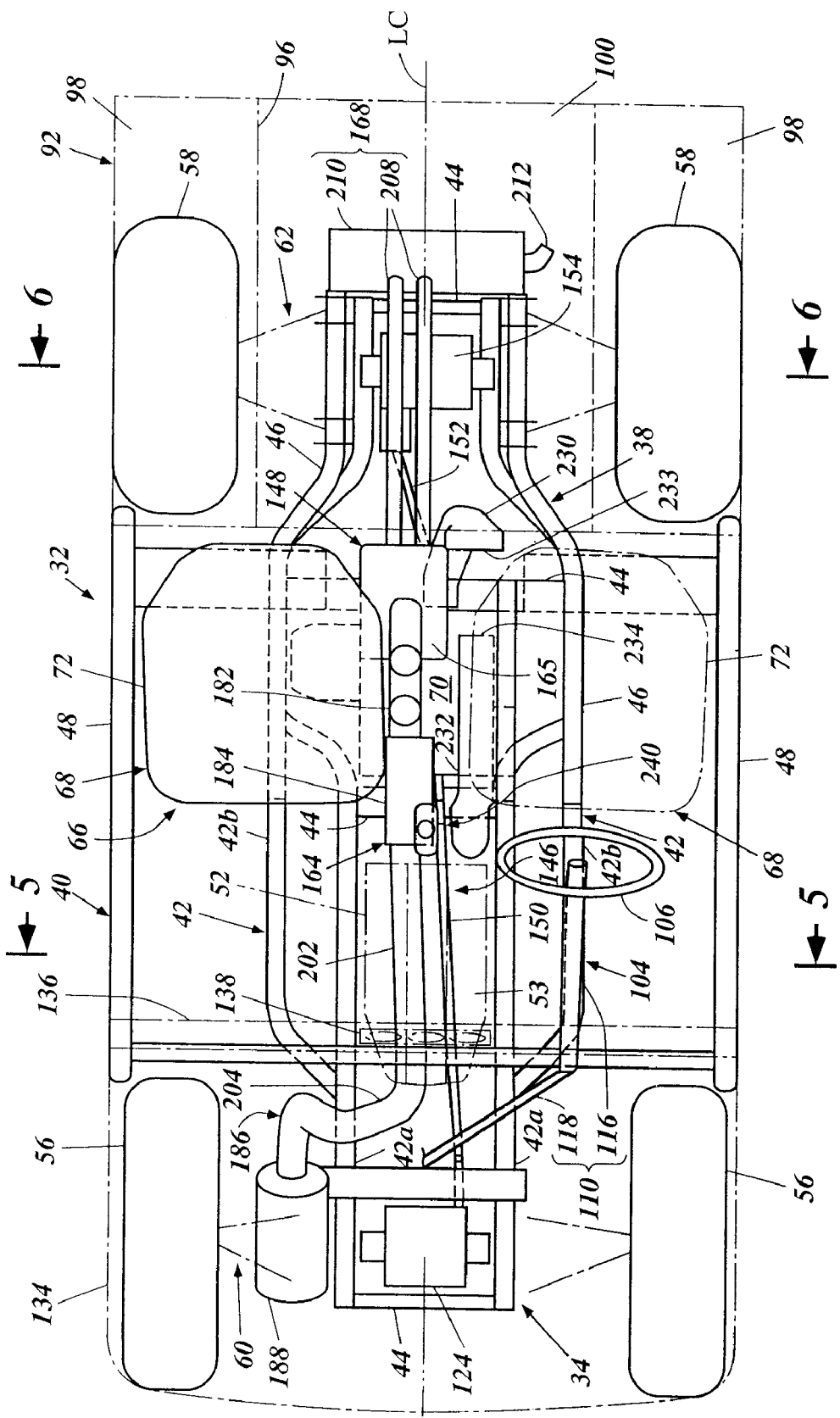
FIG. 2 is a top plan view of the off-road vehicle of FIG. 1.
Figure 5:
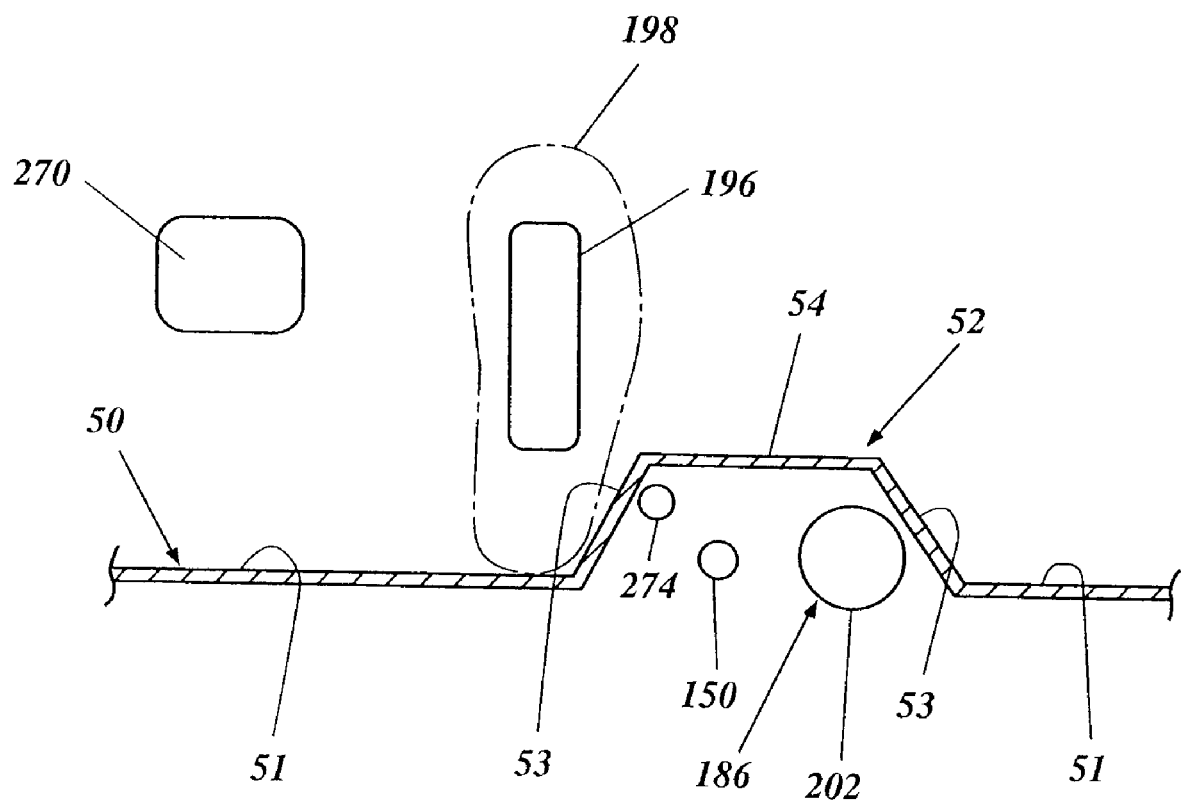
FIG. 5 is a partial sectional view taken along the line 5-5 of FIG. 2.

With reference to FIGS. 1, 2 and 5, the off-road vehicle 30 preferably has an open tubular-type frame 32. The illustrated frame 32 comprises a main frame section 34, a front frame section 36, a rear frame section 38 and a compartment frame section (or pillar frame section) 40.

The main frame section 34 includes a pair of side frame units 42 spaced apart side by side with each other. Each side frame unit 42 comprises a front tubular member 42a and a rear tubular member 42b. Each tubular member 42a, 42b preferably is rectangular in section but other configurations can be used. In one variation, the front and rear members 42a, 42b can have a circular shape in section. Moreover, the members 42a, 42b can have an incomplete tubular shape such as, for example, a U-shape. A rear end of the front tubular member 42a is bent outwardly and is coupled with a mid portion of the rear tubular member 42b. A forward end of the rear tubular member 42b is bent inwardly and is coupled with a mid portion of the front tubular member 42a. Thus, in the illustrated arrangement, both of the front and rear tubular members 42a, 42b are nested together. The side frame units 42 preferably are connected by front, center and rear cross members 44 (FIG. 2) that transversely extend between the tubular members 42a, 42b.

The front frame section 36 extends generally upward from a front portion of the main frame section 34. The rear frame section 38 also extends generally upward from a rear portion of the main frame section 34. The rear frame section 38 preferably includes a pair of rear frame members 46. Several struts connect the rear frame members 46 to the side members 42 of the main frame section 34 and support the rear frame members 46 above the side members 42.

The compartment frame section 40 is disposed generally between the front and rear frame sections 36, 38 in a side view as shown in FIG. 1. The compartment frame section 40 includes a pair of compartment members 48 extending compartment members 48 are spaced apart from each other on both sides of the off-road vehicle 30 to be placed more outward than the main frame section 34 in the illustrated embodiment.

A floorboard or floor panel 50 extends in an area generally defined by the compartment members 48 in the top plan view (FIG. 2) and is affixed at least to the main frame 34. The floorboard 50 defines a passenger compartment together with the compartment frame section 40. As best shown in FIG. 5, the illustrated floorboard 50 generally is a flat panel with a portion that projects upward. That is, the floorboard 50 comprises a horizontal section 51 defining a generally flat area and a projection 52 defining a tunnel extending along a longitudinal center plane LC (FIG. 2) of the frame 32 that extends vertically and fore to aft. The horizontal section 51 can support feet of a driver and a passenger and also can be used as a step when the driver or the passenger enters or leaves the passenger area of the off-road vehicle 30. The illustrated projection 52 is configured as a trapezoid in section and thus has slanted side surfaces 53 and a top surface 54. Other configurations also can be used.

The main, front, rear and compartment frame sections 34, 36, 38, 40 preferably are welded to each other. The illustrated structure and arrangement of the frame 32, and the combination of the frame 32 and the floorboard 50 are merely one example. Various structures, arrangements and combinations other than those are practicable. For instance, the respective frame sections 34, 36, 38, 40 can be provided with struts or reinforcement members that are not described above.

With reference to FIGS. 1 and 2, the off-road vehicle 30 preferably has a pair of front wheels 56 and a pair of rear wheels 58 both supporting the frame 32. Each wheel 56, 58 preferably has a tire that is sized and configured to advantageously proceed over rough roads and in mud and water. Relative to most similar conventional off-road vehicles, the tire can have a higher internal pressure and/or can be equipped with an inner tube, if desired. In some embodiments, a tubeless tire, which is relatively wide and which has a relatively low air pressure, can be used. In one arrangement, the selected tires are sized as follows: 25×8-12 at the front end and 25×10-12 at the rear end.

The front and rear wheels 56, 58 preferably are coupled with the frame 32 through a front suspension mechanism 60 and a rear suspension mechanism 62, respectively. The front suspension mechanism 60 swingably (up and down) and independently suspends both the front wheels 56. The rear suspension mechanism 62 also swingably (up and down) and independently suspends both the rear wheels 58. Thus, the illustrated off-road vehicle 30 preferably features four wheel independent suspension.

Figure 3:
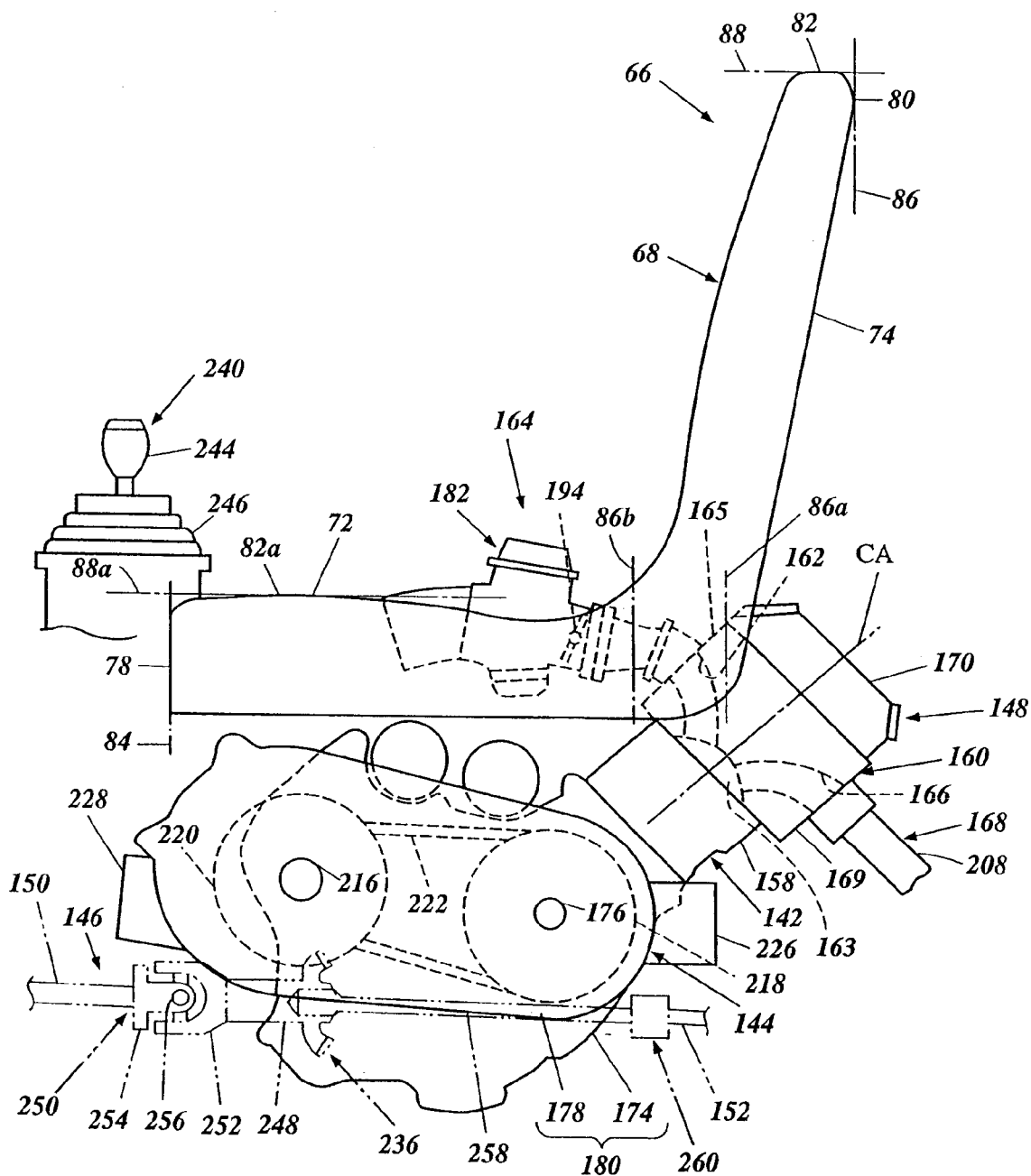
FIG. 3 is a side elevational view of an engine unit of the off-road vehicle.

With reference to FIGS. 1-3, the off-road vehicle 30 preferably has a seat unit 66. The illustrated seat unit 66 comprises a pair of seats or seat sections 68 such that the driver and the passenger can sit side by side. In some arrangements, the seat unit 66 can comprise a bench style, or split bench style, seat. In such arrangements, two or more seating positions are positioned laterally across the vehicle.

In the illustrated arrangements, a pair of separate seat sections 68 are provided. The rear frame section 38, at least in part, forms a pair of seat pedestals (not shown). Each seat 68 and each seat pedestal together form a seat assembly. The illustrated off-road vehicle 30 thus has two sets of seat assemblies. The seat assemblies are spaced apart from each other to form a space 70 (FIG. 2) therebetween.

A preferable construction or structure of an off-road vehicle similar to the off-road vehicle 30 is disclosed in, for example, a co-pending U.S. application Ser. No. 10/119,439 titled "ENGINE ARRANGEMENT FOR OFF-ROAD VEHICLE," having a co-pending U.S. application Ser. No. 10/791,111, titled "OFF-ROAD VEHICLE WITH TRANSMISSION," having U.S. application Ser. No. 12/116,118, titled "FLOOR ARRANGEMENT FOR OFF-ROAD VEHICLE," having a co-pending U.S. application Ser. No. 10/790,932, titled "STEERING SYSTEM FOR OFF-ROAD VEHICLE," having a co-pending U.S. application Ser. No. 10/791,164, titled "OFF-ROAD VEHICLE WITH AIR INTAKE SYSTEM," having a co-pending U.S. application Ser. No. 11/775,772, titled "OFF-ROAD VEHICLE WITH WHEEL SUSPENSION," having a co-pending U.S. application Ser. No. 10/792,463, titled "FRAME ARRANGEMENT FOR OFF-ROAD VEHICLE," having and a co-pending U.S. application Ser. No. 12/116,118, titled "TRANSMISSION FOR OFF-ROAD VEHICLE," having the entire contents of which are hereby expressly incorporated by reference.

In this description, the terms "front" and "forward" mean the direction in which the driver or passenger looks straight when seated on the seats 68. Also, the terms "rear," "rearward" and "backward" mean the direction opposite to the front direction.

Each seat 68 preferably comprises a seat cushion 72 and a seat back 74. The seat cushion 72 extends generally horizontally over the seat pedestal and is detachably or removably affixed to the seat pedestal. The seat back 74 extends generally vertically and upward from a rear portion of the seat cushion 72. In the illustrated arrangement, the seat cushion 72 and the seat back 74 are formed unitarily. In one variation, the seat cushion 72 and the seat back 74 can be separately formed and assembled together.

With reference to FIG. 3, the illustrated seat unit 66 has a forward end 78, a rear end 80 and a top end 82. In this arrangement, the forward end 78 of the seat unit 66 is defined by forward ends of the seat cushions 72. If, however, the seat pedestals extend forward of the seat cushions 72, forward ends of the seat pedestals can define the forward end of the seat unit 66. An imaginary forward, generally vertical plane 84 can be defined through the forward end of the seat unit 68.

The rear end 80 and the top end 82 preferably are defined by rear ends of the seat backs 74 and top ends of the seat backs 74, respectively. An imaginary rearward, generally vertical plane 86 can be defined through the rear ends of the seat backs 74. Also, an imaginary, generally horizontal plane 88 can be defined through the top ends 82 of the seat backs 74. The seat 68, however, can be shaped in various configurations. The seat back may be omitted under some circumstances. If the seat back 74 is omitted, the imaginary rear, generally vertical plane 86 can be defined more forwardly as indicated by the reference numeral 86A. Furthermore, the rear, generally vertical plane 86 may be defined more forwardly as indicated by the reference numeral 86B if the thickness of the seat back 74 is reduced. Also, the generally horizontal plane 88 may be shifted downward to a top surface 82A of each of the seat cushions 72 as indicated by the reference numeral 88A.

Thus, the forward, rear and top ends 78, 86, 82, the imaginary forward and rear generally vertical planes 84, 86 and the imaginary generally horizontal plane 88 are normally determined depending on a configuration of the seat assembly, which includes the seat 68 and the seat pedestal in the illustrated arrangement. More practically, the rear end 86 should be substantially on the imaginary, generally vertical forward plane 86A or the imaginary, generally vertical rear plane 86B. Also, the top end 82 should be substantially the top surface 82A of the seat cushions 72 and should be on the imaginary, generally horizontal plane 88A.

Because the seats 68 are positioned on the seat pedestals, which have a certain height, a relatively large space is formed below the imaginary horizontal plane 88A. Additionally, the seat unit 66 can have any number of seats, such as, for example, three seats in some alternative arrangements.

Figure 6:
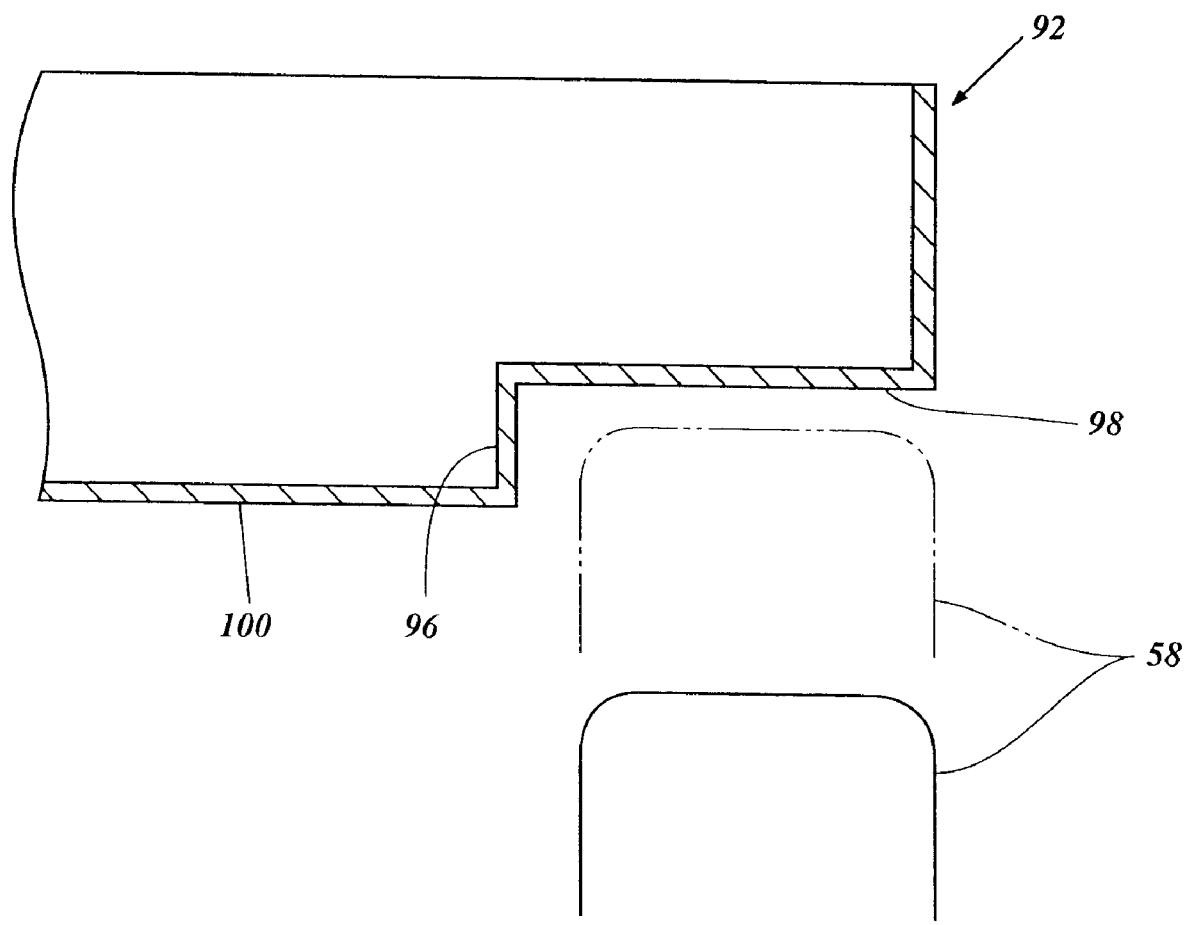
FIG. 6 is a partial sectional view taken along the line 6-6 of FIG. 2.

With reference to FIGS. 1, 2 and 6, the off-road vehicle 30 preferably has a carrier or cargo box 92 behind the seat unit 66. The illustrated carrier 92 extends over a rear portion of the rear frame section 38 and is suitably affixed at least to the rear frame members 46. In one arrangement, the carrier 92 can be tipped rearward to allow its contents to be dumped. The carrier 92 preferably is formed generally in the shape of a rectangular parallelepiped and has a bottom, a front, a rear and a pair of lateral sides. That is, the carrier 92 is generally configured as an open-topped box.

As best shown in FIG. 6, the bottom of the carrier 92 preferably comprises steps 96 on both sides such that side portions 98 of the bottom are positioned higher than a central portion 100 of the bottom. The steps 96 advantageously reduce the likelihood that the rear wheels 58 would contact carrier 92 when the rear wheels 58 are in an upper most position of suspension travel. It should be noted that the described movement of the rear wheels 58 is the relative movement thereof in relation to the carrier 92. The center bottom portion 100 thus increases the capacity of the carrier 92. Each step 96 preferably extends fore to aft as shown in FIG. 2. Longitudinally shortened steps (similar to wheel wells) also can be used.

The center bottom portion 100 helps lower the center of gravity of the carrier 92. The illustrated off-road vehicle 30 thus features enhanced stability. The steps 96 also reduce lateral movement of loads. Manufacture of the carrier 92 is simple and cost effective because the steps 96 only extend fore to aft. In addition, the steps 96 may increase the stiffness of the carrier 92.

Figure 4:
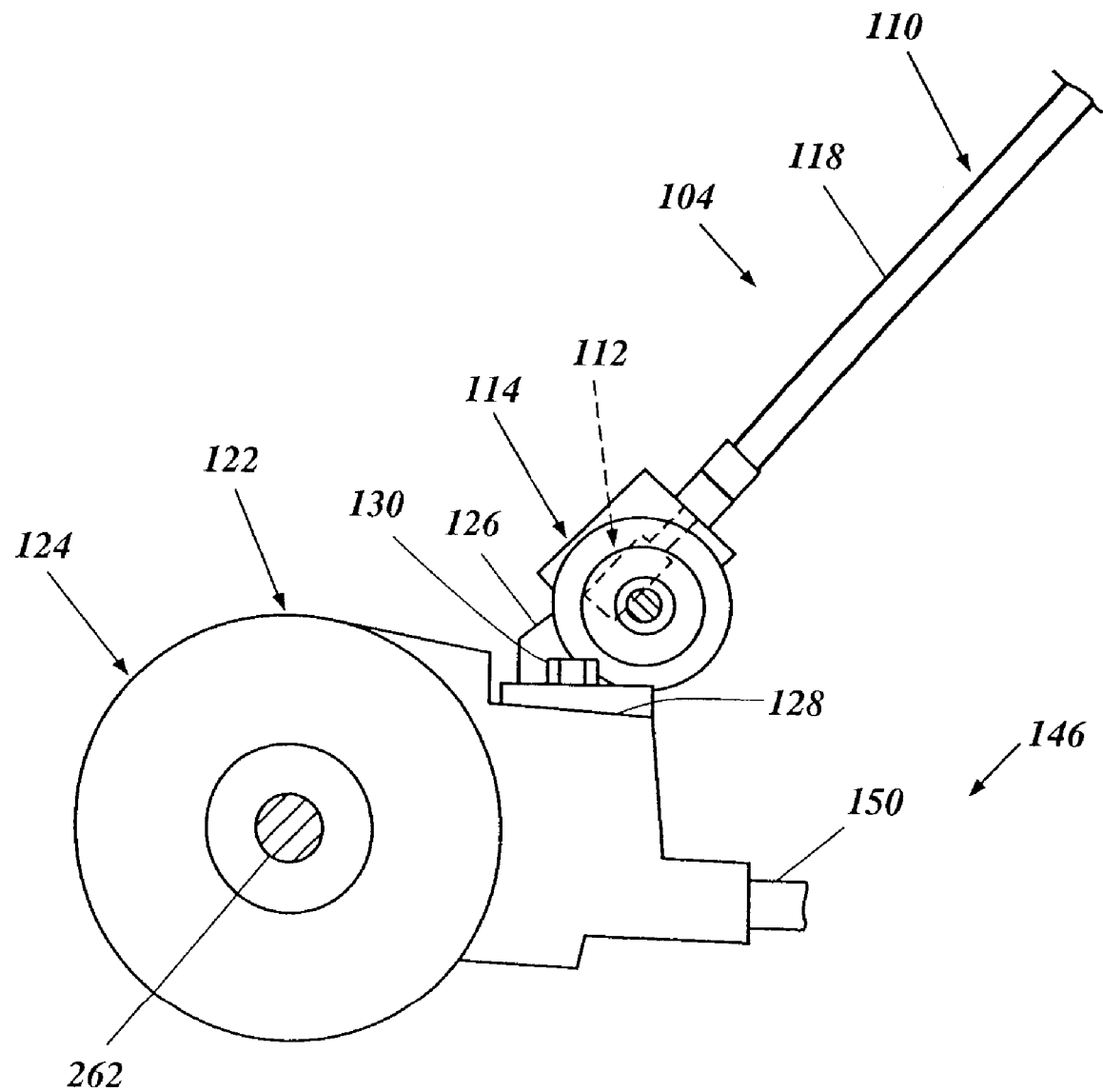
FIG. 4 is a side elevational view of a front differential and a portion of a steering mechanism of the off-road vehicle.

With reference to FIGS. 1, 2 and 4, the off-road vehicle 30 comprises a steering mechanism 104. The steering mechanism 104 in the illustrated arrangement includes a steering wheel 106. The steering wheel 106 is affixed to the frame 32 for steering movement in front of the seat 68 for the driver, which is located on the left-handed side of the illustrated off-road vehicle 30.

The illustrated steering mechanism 104 preferably comprises a steering shaft unit 110 coupled with the steering wheel 106, a tie-rod (not shown) coupled with the front wheels 56, and a rack-and-pinion assembly 112 (FIG. 4) that connects the steering shaft unit 110 to the tie-rod. The rack-and-pinion assembly 112 converts the pivotal movement of the steering wheel 106 to an axial movement of the tie-rod. The rack-and-pinion assembly 112 preferably is housed in a gear case 114.

The steering wheel 106 can be rotated clockwise and counterclockwise to effect turning movement of the steerable wheels. In some arrangements, a control stick can be used in place of a steering wheel 106. Other suitable directional control devices also can be used, such as, without limitation, handlebars, push-buttons, foot pedals and the like.

As best shown in FIG. 2, the illustrated steering shaft unit 110 comprises an upper steering shaft 116 and a lower steering shaft 118 both pivotally affixed to the frame 32. The upper shaft 116 extends upward and rearward toward the driver's area and the steering wheel 106 is affixed to the top end of the upper shaft 116. The upper shaft 116 preferably extends generally parallel to the longitudinal center plane LC. The lower shaft 118 extends toward the longitudinal center plane LC (i.e., toward a laterally central area of the vehicle) from a lower end of the upper shaft 116 through a universal joint (not shown) and is coupled with the rack-and-pinion assembly 112, which is mounted within the case 114.

The tie rods preferably are connected to rod sections that extend outward from the rack and pinion assembly 112. In some arrangements, an inner ball joint couples the rod sections to the respective tie rods. Also, an outer ball joint preferably couples each tie rod to a knuckle arm (not shown) that is associated with each front wheel 56. Each knuckle arm is coupled with a king pin (not shown) that extends from an axle of the front wheel 56. The tie-rods move axially along with the rod sections when the steering shaft 110 is rotated.

As described above, the vehicle 30 preferably includes four wheel independent suspension. In such arrangements, as discussed above, the outer ball joints can move around on an imaginary sphere that is defined about the inner ball joint. In other words, the outer ball joint can move transversely as well as around the surface of the imaginary sphere. The knuckle arc is only capable of moving along an arc defined by the suspension link connecting the wheel to the frame. The knuckle arm, thus, rotates about the king pin and causes bump steering unless the curve defined by the suspension link is consistent with the sphere defined about the inner ball joint. In addition, bump steering causes changes in the toe angle of the front wheels.

To reduce bump steering, as shown in FIG. 4, the gear case 114 preferably is mounted on a front differential housing 122. The front differential housing 122 advantageously is positioned on the longitudinal center plane LC of the frame 32. The front differential housing 122 also preferably is disposed between the front tubular members 42a at a location just rearward of a forwardmost cross member 44 in the illustrated arrangement. In one arrangement, the gear case 114 can be unitarily formed with the differential housing 122. The front differential housing 122 incorporates a front differential gear unit 124 and is relatively stiff. The gear case 114 preferably has a bracket 126 extending downward and the differential housing 122 comprises a mount surface 128. The bracket 126 is affixed to the mount surface 128 by bolts 130 or other suitable mounting techniques.

Preferably, the mount surface 128 is a top surface of the housing 122. That is, a bottom surface of the illustrated gear case 114 can be secured to the top surface of the housing 122. Accordingly, sufficient clearance can be provided adjacent another surface of the gear case 114 to enable the lower steering shaft 118 to be coupled to the rack-and-pinion assembly 112. The illustrated arrangement also advantageously enables the steering shaft 110 to be shortened, which decreases its weight, because the surface adjacent to the coupling region is closer to the top surface 128 of the housing 122. Moreover, the tie-rods are positioned in the illustrated arrangement in a manner that reduces the likelihood that they will interfere with the shafts of the front differential 124, which are described in greater detail below.

Because the front differential housing 122 and the gear case 114 are secured together at a location along the longitudinal center plane LC, the tie-rods can be elongated relative to a construction in which the gear case 114 is mounted off-center with respect to the longitudinal center plane LC. Further, the tie-rods can have substantially equal lengths to each other while also being elongated in the illustrated arrangement. The elongation of the tie rods results in an increased diameter or circumference of the imaginary spherical surface.

The enlarged imaginary spherical surface greatly increases the available suspension designs with which bump steering can be reduced. Moreover, the illustrated arrangement greatly decreases the toe angle changes of the right and left front wheels 56 caused by movements controlled by the suspension system. Accordingly, greater design freedom is provided while simultaneously reducing bump steering. Furthermore, no special brackets or stays are used to mount the rack and pinion arrangement (e.g., the gear case 114) and the gear case 114 can be securely mounted to the frame 32 through the front differential housing 122. During assembly of the vehicle, the gear case 114 can be affixed to the front differential housing 122 before the housing 122 is affixed to the frame 32 which eases assembly because the connection of the front differential housing 122 and the gear case 144 can occur outside of the cramped space within the vehicle.

Also, the mounting arrangement only requires the mount surface 128 to be formed on the differential housing 122, because the gear case 114 can have the bracket 126 regardless whether the gear case 114 is affixed to the differential housing 122 or not.

With reference to FIGS. 1 and 2, a hood or bonnet 134 surrounds at least a front portion of the main frame section 34, the front frame section 36, the front wheels 56 and a major portion of the steering mechanism 104. A dashboard 136 preferably depends from a rear portion of the hood 134. The dashboard 136 faces toward the passenger compartment and a meter unit 138 preferably is disposed in a central portion of the dashboard 136. The meter unit 138 preferably incorporates meters and/or gauges such as, for example, a speedometer, a fuel level meter, and the like. Because of this meter unit arrangement, the driver can easily view the individual meters at a glance.

With reference to FIGS. 1-5, the off-road vehicle 30 has a prime mover that powers the off-road vehicle 30 and particularly the front and rear wheels 56, 58. The prime mover preferably is an internal combustion engine 142. Alternatively, an electric motor can replace the engine 142. Engine power is transferred to the front and rear wheels 56, 58 through a suitable transmission 144 and a suitable drive mechanism 146. In the illustrated arrangement, the engine 142 and the transmission 144 are coupled together to form an engine unit 148. The illustrated transmission 144 advantageously includes an endless V-belt transmission mechanism and a switchover mechanism. The illustrated drive mechanism 146 comprises a forward driveshaft 150 extending forward from the engine unit 148, a rear driveshaft 152 extending rearward from the engine unit 148, the front differential 124 is coupled with the front axles (not shown) of the front wheels 56, and a rear differential 154 is coupled with the rear axles (not shown) of the rear wheels 58. In some arrangements, a single axle can replace the half axles.

As shown in FIGS. 1-3, the engine unit 148 preferably is positioned generally lower than the imaginary, generally horizontal plane 88 and generally in the space 70 defined between the seat assemblies. The illustrated engine 142 operates on a four-stroke combustion principle, however, other engine operating principles also can be used. The engine 142 preferably has a single cylinder block 158 that extends generally upward and rearward from a lower section of the engine unit 148. That is, the cylinder block 158 has a cylinder axis CA that inclines relative to vertical at a certain angle. The illustrated cylinder axis CA inclines from vertical at approximately 45 degrees.

In the illustrated arrangement, the engine 142 is an internal combustion engine. As such, the cylinder block 158 preferably defines a cylinder bore (not shown) therein. A piston (not shown) is reciprocally disposed within the cylinder bore (not shown). A cylinder head 160 preferably closes an upper end of the cylinder bore to define, together with the cylinder bore and the piston, a combustion chamber 163.

The cylinder head 160 also defines a pair of intake ports 162 and a pair of exhaust ports 166 that communicate with the combustion chamber 163. An intake valve can be provided at each intake port 162 to selectively open the combustion chamber 163 to an air intake system 164. In the illustrated arrangement, the air intake system 164 is coupled with the intake ports 162 at a front surface 165 of the cylinder head 160. The front surface 165 of the cylinder head 160 preferably is disposed substantially within the space 70 and preferably faces generally forward and upward. With reference to FIG. 2, the front surface 165 desirably is disposed generally between the seats 68.

The air intake system 164 introduces air into the combustion chamber 163 through the intake ports 162 when the intake valves (not shown) open the passage into the combustion chamber 163. An exhaust valve (not shown) also is provided at each exhaust port 166 to selectively open the combustion chamber 163 to an exhaust system 168. In the illustrated arrangement, the exhaust system 168 is coupled with the exhaust ports 166 at a rear surface 169 of the cylinder head 160. The rear surface 169 of the cylinder head 160 is positioned substantially opposite to the front surface 165 and generally faces rearward and downward. The exhaust system 168 routes exhaust gases from the combustion chamber 163 to an outside location.

A cylinder head cover 170 is attached to the cylinder head 160 to enclose one or more camshafts (not shown). The camshafts (not shown) preferably are journaled on the cylinder head 160. The camshafts (not shown) actuate the intake and exhaust valves at speeds that are generally in proportion to the engine speed. Other suitable methods of actuating the valves also can be used.

An upper section of the illustrated engine unit 148 includes the cylinder block 158, the cylinder head 160 and the cylinder head cover 170. The upper section at least in part extends rearwardly beyond the imaginary rear, generally vertical plane 86 (and 86A or 86B).

A lower section of the engine unit 148, which is the balance of the engine unit 148, comprises a crankcase 174, which closes a lower end of the cylinder bore (not shown). A crankshaft 176 preferably is journaled within the crankcase 174 and is coupled with the piston (not shown) in any suitable manner. In the illustrated arrangement, the crankshaft 176 extends generally transverse to a direction of travel of the vehicle but other orientations also can be used. The reciprocal movement of the piston results in rotation of the crankshaft 176. The crankshaft 176 preferably drives the camshafts via a camshaft drive mechanism.

The crankcase 174 also houses an input shaft for a shiftable portion of the transmission 144. The input shaft is positioned forward of the crankshaft 176. The lower section of the engine unit 148 also comprises a V-belt housing 178, which is positioned next to the crankcase 174 in the illustrated arrangement. Moreover, in the illustrated arrangement, the V-belt housing 178 is defined on the left-hand side of the crankcase 174. The V-belt housing 178 houses the V-belt transmission mechanism (e.g., continuously variable transmission). Thus, the lower section of the engine unit 148 (which comprises at least the crankcase 174 and the V-belt housing 178) also defines, at least in part, a transmission housing 180. The transmission 144 will be described in greater detail below.

With reference to FIGS. 1-3 and 5, the illustrated air intake system 164 extends forward to a location under the hood 134 from the intake ports 162 of the engine 142. The intake system 164 preferably comprises a throttle body or carburetor 182, an accumulator or plenum chamber 184, an air intake duct 186 and an air cleaner unit 188.

With reference to FIG. 3, the throttle body 182 is connected to the intake ports 162 through an air intake conduit 192. The throttle body 182 comprises a throttle valve 194 that regulates a rate of airflow amount delivered to the combustion chamber 163. The throttle valve 194 preferably is a butterfly valve and generally is journaled for pivotal movement. The level of airflow depends on an angular position of the throttle valve 194—when the throttle valve is closed or substantially closed, minimal air flow results, while when the throttle valve is opened or substantially opened, maximum air flow results.

An accelerator pedal or control member 196 (FIG. 5) preferably is disposed at a front end of the floorboard 50 for pivotal movement to control the position of the throttle valve 194. A throttle cable connects the accelerator pedal 196 to the throttle valve 194. The driver thus can control the throttle valve 194 by adjusting an angular position of the accelerator pedal 196 with a foot 198. Normally, the greater the throttle valve 194 opens, the higher the rate of airflow amount and the higher the engine speed. Other suitable mechanisms and/or electrical connections also can be used to transmit operator demand to the throttle valve or engine.

With reference to FIG. 5, the heel (i.e., lower portion of the foot 198) of the driver can lean against the slanted side surface 53 on the left-hand side of the projection 52 when the foot 198 is in position to operate the accelerator pedal 196 because the slanted side surface 53 is located generally adjacent to the accelerator pedal 196. In other words, the slanted portion 53 functions as a foot brace and reduces the likelihood that the operator's foot 198 will slide off of the accelerator pedal 196 when the off-road vehicle 30 is operated over rough terrain or when the off-road vehicle 30 turns a sharp corner at a relatively high speed, which increases the centrifugal forces transmitted to the foot 198. Thus, the illustrated construction can provide the driver with better body control and improved driving body position. Similarly, the slanted side surface 53 on the right-hand side also can function as the foot brace. Thus, the passenger, or driver in some configurations, can also have a foot brace for use during operation of the vehicle.

With reference again to FIG. 3, the throttle body (e.g., the carburetor) 182, which functions as a charge former, preferably also has a fuel measurement mechanism that measures an amount of fuel mixed with the air in accordance with the rate of airflow. Because of this fuel measurement mechanism, the air/fuel ratio supplied to the engine can be controlled and/or optimized depending upon engine operating conditions. The fuel is delivered to the throttle body 182 from a fuel tank (not shown) that can be suitably mounted and suitably positioned on the frame 32.

Other charge formers such as, for example, a fuel injection system can be used. The fuel injection system has a fuel injector that is configured to spray fuel directly into the combustion chamber 163 or into a portion of the air intake system downstream of the throttle valve. An engine control unit (ECU) can control the amount of fuel injected, for example, in accordance with the airflow rate.

With reference to FIGS. 1 and 2, the accumulator 184 can be coupled with an inlet of the throttle body 182. The accumulator 184 generally forms a portion of the intake duct 186 in the broad sense of the term but provides a larger volume or cross-sectional area as compared to the balance of the intake duct 186. Such a construction allows air to accumulate prior to delivery to the throttle body 182. As best shown in FIG. 1, the accumulator 184 is generally shaped as an arcuate configuration. Such a construction advantageously smoothens the delivery of air to the engine. Furthermore, because the accumulator 184 has a relatively large volume and is disposed next to the throttle body 182, the intake efficiency of the induction system is greatly improved. That is, sufficient air can be quickly supplied to the engine 142 even when the engine is being operated at a relatively high engine speed. This is advantageous due to the longer length of the intake duct 186.

In the illustrated arrangement, the air intake conduit 192, the throttle body 182 and the accumulator 184 together extend forwardly of the engine within a region defined between the seats 68. Upper portions of the throttle body 182 and the accumulator 184 preferably are positioned slightly higher than the top ends 82A of the seat cushions 72. A forward-most portion of the accumulator 184 turns downward at or just forward of the forward end of the seat assemblies.

Because of this arrangement, the throttle body 182 and at least a portion of the accumulator 184 are interposed between the seat assemblies and are positioned within, or just adjacent to, the space 70. Thus, the throttle body 182 and the accumulator 184 are positioned within a protective region of the vehicle that is located higher than a lowermost surface of the frame assembly or the floorboard 50. Such positioning reduces the likelihood that dirt and other road debris that may be kicked up underneath the vehicle will damage the throttle body 182 or the accumulator 184. Such placement also facilitates servicing of these components and protects these components from water damage while fording a stream, a mud bog or the like.

The illustrated accumulator 184, which is positioned within the most downstream portion of the illustrated intake duct 186, ends above a lowermost surface defined by the rear frame section 38. The balance of the air intake duct 186, which has a smaller volume or cross-sectional area than the accumulator 184, preferably comprises a downstream section 200, a middle section 202 and an upstream section 204, which are provide a contiguous air flow path in the illustrated embodiment. The downstream section 200 extends downwardly from the accumulator 184 to a lowermost portion of the rear frame section 38. The middle section 202 extends forwardly in a generally horizontal direction from a lower end of the downstream section 200.

With reference to FIG. 5, in the illustrated arrangement, the middle section 202 extends through a tunnel defined by the projection 52 of the floorboard 50. Because of this arrangement, the middle section 202 advantageously is positioned higher than the horizontal section 51 of the floorboard 50, which greatly reduces the likelihood of damage from rocks, sticks, road debris or the like. Furthermore, the driver and/or the passenger are able to maintain a good riding body position because the horizontal section 51 is positioned generally vertically lower than the middle section 202. Moreover, the illustrated arrangement contributes to a lower center of gravity for the off-road vehicle 30 because the height of the seats 68 does not need to be increased to accommodate the middle section 202 or another portion of the air induction system.

The middle section 202 preferably ends at a location close to the front frame section 36. The upstream section 204 extends generally vertically upward from the middle section 202. In addition, the upstream section 204 preferably is positioned within a space defined below the hood 134. To increase the protection from ingestion of water, the forwardmost portion of the upstream section 204 extends forward and slightly downward along a lower surface of the hood 134.

The air cleaner unit 188 preferably is attached at an upstream end of the intake duct 186 and extends generally along the lower surface of the hood 134. The illustrated air cleaner unit 188 has a relatively large volume and has a cleaner element therein. The air cleaner unit 188 also has an air inlet port. Ambient air is drawn into the air cleaner unit 188 through the air inlet port and passes through the filtration element such that foreign substances such as, for example, dust, mud or water can be substantially removed from the air that is being introduced into the engine.

The air, which has been cleaned in the cleaner unit 188, flows to the accumulator 184 through the intake duct 186. The airflow amount is regulated by the throttle valve 194 in the throttle body 182. Simultaneously, an amount of fuel is measured by the fuel amount measurement mechanism in the throttle body 182 in response to the air amount. An air/fuel charge that has a proper air/fuel ratio is formed and is delivered to the combustion chamber 163 when the intake valves open the intake ports 162. The air/fuel charge is ignited by an ignition system (not shown) and burns within the combustion chamber 163. The burning of the charge causes expansion of the gases and increased pressure that results in movement of the piston. The crankshaft 176 is rotated within the crankcase 174 by the movement of the piston.

With reference to FIGS. 1-3, the burnt charge, i.e., exhaust gases, are discharged through the exhaust system 168. The illustrated exhaust system 168 preferably comprises a pair of exhaust conduits 208 and a muffler 210. The exhaust conduits 208 are coupled with the respective exhaust ports 166 and extend generally rearward. The exhaust conduits 208 extend generally parallel to each other. Preferably, the exhaust conduits 208 have a wavy shape that serpentines up and down, as shown in FIGS. 1 and 2. Rearward ends of the exhaust conduits 208 preferably extend beyond a rear end of the rear frame section 38. The muffler 210 is coupled with the rear ends of the exhaust conduits 208.

The muffler 210 preferably has a cylindrical shape. A center axis of the muffler 210 preferably extends in a generally transverse direction relative to the longitudinal center plane LC of the frame 32. The muffler 210 has a relatively large volume to reduce exhaust energy and noise. An outlet port 212 can be formed at a side surface, which is on a left-hand side in the illustrated embodiment. Other arrangements also can be used. The exhaust gases flow through the exhaust conduits 208 and are discharged through the outlet port 212 of the muffler 210.

The engine 142 can have systems, devices, components and members other than those described above. For example, the illustrated engine 142 can employ a liquid cooling system that uses coolant (e.g., water), which is circulated through a heat exchanger, to cool the engine 142.

With reference to FIGS. 1-3, the change speed mechanism and the V-belt transmission mechanism together have a common output shaft 216. The output shaft 216 extends generally parallel to the crankshaft 176 at a location in front of the crankshaft 176. The output shaft 216 preferably extends through the crankcase 174 and the V-belt housing 178 and is journaled for rotation relative to these components. Because of this arrangement, the output shaft 216 is positioned at a location generally between the front wheels 56 and the crankshaft 176. In other words, the crankshaft 176 is positioned between the output shaft 216 and the rear wheels 58.

The crankshaft 176 extends into the V-belt housing 178 and carries a drive pulley 218 (FIG. 3). The output shaft 216 carries a driven pulley 220. The drive and driven pulleys 218, 220 both comprise an axially fixed pulley member and an axially movable pulley member that is movable along the respective axis of the crankshaft 176 or the output shaft 216. Together, the pulley members form a V-shaped valley that expands and contracts with changes in engine speed.

An endless belt 222 or chain, which belt has a V-configuration in section is wound around the drive pulley 218 and the driven pulley 220. Normally, the movable pulley member of the drive pulley 218 is urged to stay apart from the fixed pulley member by the bias force of a bias member such as, for example, a spring. The movable pulley member of the driven pulley 220 is urged to stay close to the fixed pulley member by the bias force of a bias member such as, for example, a spring.

Each movable pulley member can move axially against the bias force by a clutch mechanism which is provided on either pulley 218, 220. The clutch mechanism acts by centrifugal force created when the crankshaft or output shaft turns at a speed higher than a preset speed. The change in diameter of one pulley causes a corresponding change in the other pulley. Thus, both diameters of the drive pulley 218 and the driven pulley 220 vary to automatically change the transmission ratio between the drive pulley 218 and the driven pulley 220, normally in response to the engine speed.

With reference to FIGS. 1-3, the V-belt housing 178 preferably has an air inlet port 226 at a rear end and an air outlet port 228 at a front end. An air inlet duct 230 (FIGS. 1 and 2) preferably is coupled to the inlet port 226, while an air inlet duct 232 preferably is coupled to the outlet port 228. The inlet duct 230 extends generally rearward and upward and generally behind the seat back 74 on the left-hand side. The inlet duct 230 has an inlet opening 233 that opens forward and is positioned higher than top surfaces of the seat cushions 72. The outlet duct 232 extends generally upward and rearward and generally along a bottom surface of the seat cushion 72 on the left-hand side. The outlet duct 232 has an outlet opening 234 that opens generally rearward.

Cooling air is introduced into the V-belt housing 178 through the inlet duct 230 and the air inlet port 226 when the crankshaft 176, the output shaft 216 and the drive and driven pulleys 218, 220 rotate. In some arrangements, one or both of the pulleys can be provided with fan blades to help induce higher speed air flow as the engine speed increases. Other embodiments can provide a ram air type of air flow. Having circulated with the belt chamber of the transmission, the air then is discharged through the outlet port 228 and the outlet duct 232.

With reference to FIGS. 1-3, the engine output that has been transferred to the output shaft 216 through the V-belt mechanism is transferred to the drive mechanism 146 through the change speed transmission mechanism. This mechanism preferably is configured to provide a parking state, a high speed forward state, a neutral state, a low speed forward state, and a reverse state. The mechanism preferably comprises a suitable gear train that allows an operator to select among at least the above-mentioned operating states. A bevel gear assembly 236 can be coupled with the mechanism.

The mechanism also comprises a shift lever unit 240 that extends from the crankcase 174. The shift lever unit 240 preferably is connected to the rest of the switchover mechanism within the crankcase 174 through a suitable linkage (not shown). The shift lever unit 240 preferably is placed generally within the space defined between the seats 68. The illustrated lever unit 240 is positioned generally at the forward-most portion of the space. Such placement facilitates ease of use.

The shift lever unit 240 preferably comprises a lever 244 and a lever cover 246. The lever 244 preferably is affixed to the frame 32 directly or indirectly for pivotal movement around a fulcrum. In one variation, the shift lever unit 240 can comprise a lever that moves axially. The driver thus can control the change speed mechanism in the crankcase 174 and vary the transmission operating state among at least the parking state, the high speed forward state, the neutral state, the low speed forward state and the reverse state by operating the lever 244.

Because of the advantageous configuration of the drive train relative to the shift lever unit 240, the shift lever unit 240 is positioned close proximity to the change speed mechanism of the transmission 144. The linkage thus can be short enough to make the switchover mechanism compact and also to improve the feeling that the driver might have when operating the shift lever unit 240.

With reference to FIGS. 1-4, the output of the switchover mechanism is transferred to the drive mechanism 146 through the bevel gear 236. In the illustrated arrangement, the bevel gear 236 is coupled with a forward intermediate shaft 248. The forward drive shaft 150 is pivotally coupled to the forward intermediate shaft 248 through a universal joint 250. That is, the universal joint 250 comprises a first yoke 252, a second yoke 254 and a cross pin 256 pivotally coupling the first and second yokes 252, 254.

The forward driveshaft 150 is coupled with a front differential input shaft 262 (FIG. 4) of the front differential 124. The front differential housing 122 preferably encloses at least a portion of the input shaft. The front differential input shaft is coupled with a mechanism of the front differential 124, such as a pinion or differential gear. A pair of output shafts 262 extends from the mechanism of the front differential 124. Each output shaft 262 is connected to a respective one of the front wheels 56.

Preferably, the gear case 114 of the rack-and-pinion assembly 112 is positioned behind the output shafts 262. This arrangement advantageously locates the tie-rods and the knuckle arms of the steering system 104 in a space located behind linkages that connect the respective output shafts 263 with the associated front wheels 56. Thus, the knuckle arms can have a sufficient length and bump steering can be reduced. Further, such a placement provides some degree of protection to these components.

With reference to FIG. 5, the forward driveshaft 150 extends forwardly within the tunnel defined by the projection 52 of the floorboard 50 and generally adjacent to the middle section 202 of the intake duct 186. The forward driveshaft 150 thus is positioned higher than the horizontal section 51 of the floorboard 50. Accordingly, the forward driveshaft 150 is generally protected from significant impacts from rocks, sticks, road debris and the like. In some arrangements, at least a length of a lower opening of the tunnel can be closed with a protective plate or the like to further protect both the driveshaft 150 and the middle section 202 of the intake duct 186.

In the illustrated arrangement, a rear intermediate shaft 258 also is connected to the bevel gear 236 through a suitable connection. The rear driveshaft 152 is connected to the rear intermediate shaft 258 through a spline coupling 260. Other couplings or a unitary shaft can also be used. The rear driveshaft 152 is coupled with a rear differential input shaft (not shown) of the rear differential 154. The rear differential input shaft preferably is coupled with the rear wheels 58 through another differential mechanism formed within the rear differential 154.

The off-road vehicle 30 preferably has other devices, components and members. For example, the differentials can be selectively lockable such that the differential function can be eliminated on demand. Moreover, a brake system can be provided to slow or stop rotation of the wheels 56, 58 or another driveline component (e.g., the driveshafts). A brake pedal 270 (FIG. 5) can be disposed next to the accelerator pedal 196 and can be connected to brake units that are coupled with the wheels 56, 58. In some arrangements, the brake units can comprise disk brake configurations. The driver thus can stop the off-road vehicle 30 by operating the brake pedal 270.

Various ducts, conduits, cables and the like other than the forward driveshaft 150 and the air intake duct 186, which are symbolically indicated by a reference numeral 274 of FIG. 5, also can extend through the tunnel defined by the projection 52 of the floorboard 50. For example, a brake cable and a coolant hose can pass therethrough. The brake cable could form a portion of the brake system and connects the brake pedal and brake units disposed at the respective wheels 56, 58. The coolant hose could extend between the engine 142 and a radiator (not shown) that might be disposed under the hood 134 or in another suitable location. Because of this duct and conduit arrangement, those ducts, conduits and cables also can be placed higher than the horizontal section 51 of the floorboard 50 and are well protected without impinging upon the driver and passenger seating areas and without substantially raising the center of gravity of the vehicle.

In one arrangement, the crankshaft 176 can be positioned beyond the imaginary rear vertical plane 86, 86A, 86B and the output shaft 216 can be positioned between the forward vertical plane 84 and the rear vertical plane 86, 86A, 86B. In the illustrated arrangement, both the output shaft 216 and the crankshaft 176 are disposed between the imaginary forward generally vertical plane 84 and the imaginary rear generally vertical plane 86. This is also true in the illustrated arrangement even if the imaginary rear vertical plane is defined by the plane 86B. A majority of the illustrated engine unit 148, thus, can be located generally below the seat unit 66. Such an arrangement allows the wheelbase of the off-road vehicle 30 to be shortened in comparison with an arrangement in which a majority of the engine unit 148 is located behind the seat unit 66. Accordingly, the illustrated off-road vehicle 30 benefits from a substantially shortened wheel base which results in improved maneuverability.

In the illustrated arrangement, a majority of the engine unit 148 also is laterally positioned generally between the seats 68. However, in some arrangement, it may be advantageous to place a majority of the engine unit 148 under one of the seats 68. The illustrated engine unit 148 can be accommodated in such a position because the cylinder block 158, the cylinder head 160 and the cylinder head cover 170 are inclined upward. Thus, they can be positioned behind the imaginary rear vertical plane 86, 86A, 86B by slightly shifting the position of the crankshaft 176, or the positions of the crankshaft 176 and the output shaft 216, rearward. In some arrangements, the engine 142 can be disposed generally on its side such that the engine body extends generally horizontally without having a significant portion extending upward.

In the illustrated arrangement, the engine 142 is located generally rearward of the change speed mechanism including the output shaft 216. Moreover, the engine is positioned generally rearward of, and lower than, the seating area. Thus, heat generated by the engine 142 can be substantially isolated from the driver and/or the passenger, and particularly isolated from the feet of those persons both when seating and when mounting or dismounting from the vehicle. The seat backs 74 further insulate the driver and/or passenger from any heat that may radiate from the engine or exhaust system. In addition, the cylinder block 158, the cylinder head 160 and the cylinder head cover 170 in this arrangement generally are directed rearward and are positioned generally rearward of the occupants. Thus, it is very unlikely that the engine heat will affect the occupants of the vehicle.

The exhaust system 168 carries a great deal of heat as well while the intake system 164 and the charge former, e.g., the throttle body 182, generally do not generate or conduct much heat. The intake system 164 and the charge former are generally protected from heat carried by the exhaust system 168 because the exhaust system 168 is positioned opposite to the intake system 164 in the illustrated arrangement. Thus, the engine heat and the exhaust heat can be generally isolated from the intake system 164 during forward operation of the off-road vehicle 30. The temperature of the intake air, therefore, is not greatly affected by the heat generated during operation of the off-road vehicle 30 and engine output efficiency can be kept in good condition. Along these lines, placement of a radiator preferably is generally below the air intake such that heat generated in the region of the radiator does not adversely affect engine performance through heating of the air inducted into the engine.

Furthermore, in the illustrated intake system 164, the intake system 164 generally does not extend along a heat generating or conducting surface of the engine 142. Thus, the engine heat is generally isolated from the intake system 164 in this arrangement. Also, the illustrated air cleaner 188 is greatly spaced from the engine 142. As such, any air that is heated by the engine 142 and the exhaust system 168 will not be drawn into the air intake system 164, which improves the engine output efficiency. Additionally, due to the elevated nature of the air inlet and air cleaner 188, water also is very unlikely to be drawn into the intake system 164. Furthermore, because the air cleaner 188 is positioned below the hood 134, water is unlikely to splash its way into the air cleaner.

As illustrated, the exhaust conduits 208 extend along a relatively lower portion of the off-road vehicle 30 in the illustrated arrangement because the exhaust conduits 208 are directed generally downward and rearward instead a wrapping around from a forward or lateral surface of the engine. The exhaust conduits 208, thus, are sufficiently spaced apart from the driver and/or the passenger. As a result, the seats 68 can be positioned closer to the engine 142, which allows a narrower overall construction for the vehicle or a closer mounting of the split seats 68.

Although the present invention has been described in terms of a certain preferred embodiment, other embodiments apparent to those of ordinary skill in the art also are within the scope of this invention. Thus, various changes and modifications may be made without departing from the spirit and scope of the invention. The scope of the present invention is intended to be defined only by the claims that follow.

What is claimed is:

1. An off-road vehicle comprising a frame, a plurality of wheels supporting the frame, at least two seat assemblies disposed side by side on the frame, the seat assemblies being spaced apart from each other to define a space therebetween, an internal combustion engine powering the wheels, at least a portion of at least one of the two seat assemblies overlapping a portion of the engine as viewed from above, wherein the engine is disposed generally adjacent to the seat assemblies, the engine having a front surface generally facing the space with an intake port opening at the front surface.

2. The off-road vehicle as set forth in claim 1, wherein the engine has a portion positioned generally at a rear end of the space, the portion comprising the intake port.

3. The off-road vehicle as set forth in claim 2, additionally comprising an intake system extending generally forwardly from the intake port.

4. The off-road vehicle as set forth in claim 3, wherein the intake system comprises a throttle body, the throttle body comprising a throttle valve, the throttle body being at least partially disposed within the space.

5. The off-road vehicle as set forth in claim 4, wherein the intake system comprises an air intake duct disposed upstream relative to the throttle body, the intake duct generally extending forwardly from the throttle body and a forward portion of the intake duct extending downwardly.

6. The off-road vehicle as set forth in claim 5 additionally comprising a floorboard extending at least forwardly from a base portion of the seat assemblies, the intake duct further comprising a portion that extends forwardly of the seat assemblies at a location generally below a portion of the floorboard.

7. The off-road vehicle as set forth in claim 6, wherein the intake system comprises an air cleaner unit that is connected to the intake duct.

8. The off-road vehicle as set forth in claim 7 additionally comprising a hood covering at least a forward portion of the frame, the air cleaner unit being disposed below the hood.

9. The off-road vehicle as set forth in claim 5, wherein the seat assemblies define a top surface and a forward surface, the intake duct extending generally along the top and forward surfaces.

10. The off-road vehicle as set forth in claim 6, wherein the floorboard comprises an upward projection that defines a tunnel, the intake duct extending within at least a portion of the tunnel.

11. The off-road vehicle as set forth in claim 5, wherein the intake duct comprises an accumulator disposed between the throttle body and the balance of the intake duct, an inner diameter of the accumulator being greater than an inner diameter of the balance of the intake duct.

12. The off-road vehicle as set forth in claim 1, wherein the engine comprises an exhaust port communicating with the combustion chamber, the engine comprising a rear surface and the exhaust port opening through the rear surface.

13. The off-road vehicle as set forth in claim 12 additionally comprising an exhaust system, the exhaust system extending rearward from the exhaust port that opens through the rear surface.

14. The off-road vehicle as set forth in claim 2, wherein the seat assemblies define a rear surface, at least a portion of the engine being disposed forward of the rear surface.

15. The off-road vehicle as set forth in claim 2, wherein the seat assemblies define a top surface, at least a portion of the engine being disposed lower than the top surface.

16. The off-road vehicle as set forth in claim 15, wherein the seat assemblies define a rear surface, at least a portion of the engine being disposed forward of the rear surface.

17. An off-road vehicle comprising a frame, a plurality of wheels supporting the frame, at least two seat assemblies disposed side by side on the frame, the seat assemblies being spaced apart from each other to define a space therebetween, an internal combustion engine powering the wheels, at least a portion of at least one of the two seat assemblies overlapping a portion of the engine as viewed from above, wherein each of the seat assemblies comprises a seat cushion, at least a portion of the internal combustion engine being positioned higher than a bottom of the seat cushion.

18. An off-road vehicle comprising a frame, a plurality of wheels supporting the frame, at least two seat assemblies disposed side by side on the frame, the seat assemblies being spaced apart from each other to define a space therebetween, and an internal combustion engine powering at least one of the plurality of wheels, at least one of the two seat assemblies overlapping a portion of the engine as viewed from above, wherein each of the seat assemblies comprises a seat cushion, at least a portion of the internal combustion engine being positioned higher than a bottom of the seat cushion.

* * * * *